US005490150A

United States Patent [19]

Andrews et al.

[11] Patent Number: 5,490,150
[45] Date of Patent: Feb. 6, 1996

[54] METHOD AND APPARATUS FOR DATA PARITY IN A TRANSMISSION SYSTEM

[75] Inventors: Michael W. Andrews, Maplewood; Michael P. Bottiglieri, Wyckoff; Stephen J. Brolin, Livingston, all of N.J.

[73] Assignee: AT&T Corp., Murray Hill, N.J.

[21] Appl. No.: 333,905

[22] Filed: Nov. 3, 1994

Related U.S. Application Data

[63] Continuation of Ser. No. 946,687, Sep. 18, 1992, abandoned.

[51] Int. Cl.⁶ ................................................ G06F 11/00
[52] U.S. Cl. .................. 371/20.1; 371/49.2; 371/49.1; 371/47.1
[58] Field of Search .................. 371/20.1, 20.4, 371/22.2, 21.2, 15.1, 47.1, 24, 49.1, 48, 49.2, 51.1, 71; 370/14; 377/10; 455/8; 375/10, 14, 13

[56] References Cited

U.S. PATENT DOCUMENTS

| | | | |
|---|---|---|---|
| 3,958,111 | 5/1976 | Hackett | 235/153 AK |
| 4,022,979 | 5/1977 | Smith | 179/15 BF |
| 4,170,722 | 10/1979 | Blackburn | 179/175.3 R |
| 4,360,891 | 11/1982 | Branigin et al. | 364/900 |
| 4,736,376 | 4/1988 | Stiffler | 371/37 |
| 4,872,172 | 10/1989 | Sanner | 371/49.1 |
| 4,958,350 | 9/1990 | Wooley et al. | 371/37.4 |
| 5,155,735 | 10/1992 | Nash et al. | 371/49.1 |
| 5,181,207 | 1/1993 | Chapman | 371/37.4 |
| 5,228,042 | 7/1993 | Gauthier et al. | 371/205 |

Primary Examiner—Robert W. Beausoliel, Jr.
Assistant Examiner—Phung My Chung
Attorney, Agent, or Firm—Robert B. Levy

[57] ABSTRACT

The integrity of a signal path through a transmission system (12), which processes successive blocks (14) of data during a given time frame, verified by establishing the parity of a selected one of the blocks as it enters and as it leaves the system. A lack of equality between the parities is indicative of a lack of path integrity.

4 Claims, 1 Drawing Sheet

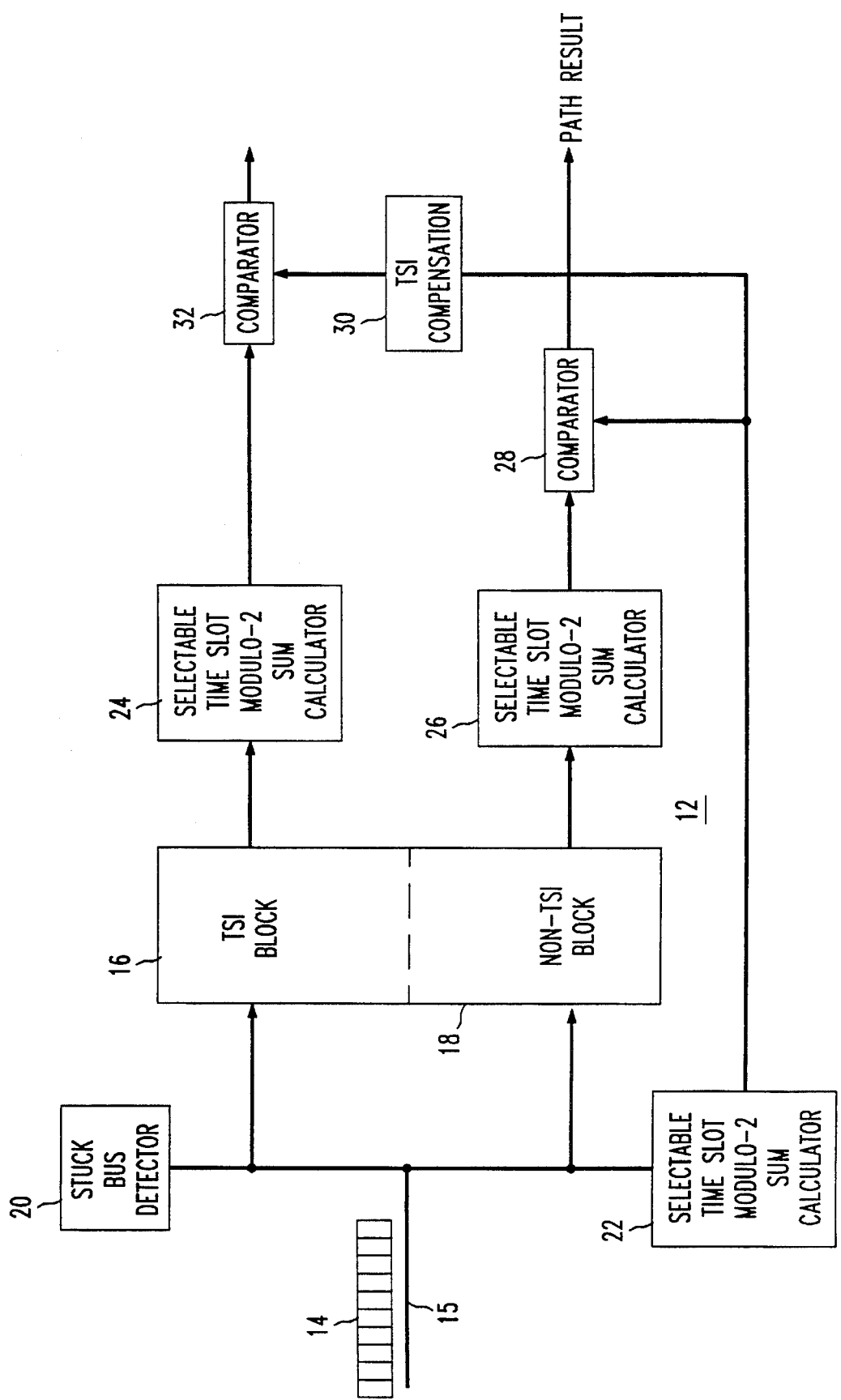

METHOD AND APPARATUS FOR DATA PARITY IN A TRANSMISSION SYSTEM

This application is a continuation of application Ser. No. 07/946,687, filed on Sep. 18, 1992, now abandoned.

TECHNICAL FIELD

This invention relates to a technique for checking the parity of successive blocks of data transmitted through a transmission system under the condition where no room exists within each data block for a parity bit.

BACKGROUND OF THE INVENTION

In the operation of a local exchange telephone network, it is desirable for a single central office to serve a large number of individual subscribers so as to achieve economies of scale. In the past, each subscriber served by a central office had to be directly connected thereto by a two-wire circuit. As a consequence, a large number of wire-pairs were required, increasing overall capital costs. In an effort to reduce the amount of cabling required to interconnect a large number of individual subscribers to a single central office, loop carrier systems have been developed to multiplex signals from the individual subscribers. A typical loop carrier system multiplexes signals from each active (e.g., off-hook) subscriber into a separate one of a plurality of time slots (channels) carried by a DS1 signal trunk connecting the loop carrier system to the central office. Since not all of the subscribers are active at any one time, the number of channels needed is usually a fraction (e.g., ½ or even ¼) of the number of subscribers connected to the loop carrier system.

In the process of multiplexing the active subscriber signals onto the multi-channel DS1 signal trunk, each active subscriber signal, which is typically analog, is convened to a multi-bit digital channel. In the past, within the transmission equipment, each multi-bit digital signal had a specific bit dedicated to represent the parity of the signal. Thus, a check of the signal parity was accomplished in the equipment by determining the signal parity and comparing the value to that represented by the dedicated parity bit.

With the advent of Integrated Services Digital Network (ISDN) services, the signal from each active subscriber initially takes the form of a multi-bit digital signal, obviating the need for any signal conversion. Thus, the active-subscriber signal may be multiplexed directly onto the DS1 signal trunk. However, within the transmission equipment, the subscriber ISDN signals are not assigned a dedicated parity bit, making parity checking difficult.

Thus, there is a need for a technique for checking the parity of a digital signal within a transmission apparatus in circumstances where there is no reserved parity bit.

SUMMARY OF THE INVENTION

Briefly, in accordance with a preferred embodiment of the invention, there is provided a method for detecting if the parity of each of a plurality of blocks of data transmitted through a transmission system, such as a subscriber loop carrier system, is maintained during transmission. The method is initiated by first establishing the parity of a selected one of the successive data blocks as it enters the transmission system. Thereafter, each data block is processed by the transmission system in a conventional manner. For example, each data block may be timeshifted, or one or more other processing operations may be performed thereon. Following processing, the parity of the selected data block is again established. The parity established for the selected data block as it leaves the transmission system is compared to the parity of the selected data block entering the system, either immediately (or after a prescribed delay interval in the event that the processing operation involved a signal delay such as occurs during a time-slot interchange). Any difference between the two parities is indicative of an error occurring during passage of the data block through the transmission system.

BRIEF DESCRIPTION OF THE DRAWING

The FIGURE is a block schematic diagram of a transmission system incorporating the parity checking technique of the present invention.

DETAILED DESCRIPTION

The FIGURE shows a transmission system 10 which incorporates an apparatus 12 in the form of a transmission system, in accordance with the invention, for comparing the parity of a selected one of a plurality of blocks of digital data 14 as the block enters the system on a bus 15, and after the selected block leaves the system. In the illustrated embodiment, each data block 14 is typically sixteen bits long and represents a particular time segment of a signal from a separate one of a plurality of telephone subscribers (not shown).

In some instances, the original telephone subscriber signal is analog in nature. Under such circumstances, the first eight bits of the data block 14 representing the analog signal correspond to a digitized sample of a segment of the signal, as obtained by pulse-code sampling techniques. The next seven bits of the data block 14 represent selected transmission characteristics of the digitized sample of the original analog subscriber signal while the last bit indicates the parity of the entire data block. With ISDN service, the original telephone subscriber signal is itself digital in nature so that the data block 14 corresponds exactly to the original signal. However, unlike the sixteen-bit data block 14 corresponding to the analog subscriber signal, the sixteen-bit data block corresponding to the ISDN subscriber signal contains no parity bit, making parity checking by conventional technique almost impossible.

For the sake of simplicity, the transmission system 12 is represented schematically by a time-slot interchanger block 16 and a non-time-slot interchanger block 18, although it should be understood that the transmission system may contain other elements, either in addition to, or in substitution for, the illustrated blocks. The time-slot interchanger block 16 typically takes the form of an AT&T T8U time-slot interchanger which serves to alter (i.e., delay) the order of a successive block 14 in the stream of data blocks passing through the interchanger. In practice, the data blocks 14 are successively transmitted during a particular time interval or frame. In practice, the time frame is approximately 125 microseconds in duration, during which time, each of thirty-two separate data blocks 14 is successively input to the transmission system 10 on the bus 15. The time-slot interchanger 16 serves to alter the order of the blocks from one interval to a succeeding interval, typically by delaying one or more blocks for a certain number of time slots or even whole time frames. For example, it may be desirable for the fifth data block 14 in a frame N (where N is an integer) to become the ninth block during the frame N+2. It is exactly this type of selectable shifting (i.e., delaying) that is performed by the time-slot interchanger block 16. In addition to performing the time-slot interchange function, the block 16 may perform other signal processing functions as well.

The non-time-slot interchanger block 18 serves to perform one or more signal processing operations on each data block 14, such as filtering for example. As compared to the data blocks 14 processed by the time-slot interchanger block 16, the data blocks 14 processed by the non-time-slot interchange block 18 remain unaltered with respect to the order in which they appear in each frame.

Also comprising pan of the transmission system 10 is a stuck-bus detector 20. The stuck-bus detector 20 typically comprises a comparator or the like for monitoring the status of the incoming data bus 15 by comparing the pattern of each successive data block 14 on the bus to the immediately preceding block. If the pattern remains the same for an extended interval, then a stuck bus condition exists.

The transmission system 12 of the invention includes a first selectable, time-slot modulo-2 sum calculator 22 coupled to the incoming data bus 15 for calculating the parity of a selected one of the data blocks 14 on the bus 15. In other words, the modulo-2 sum calculator calculates the parity of a single selected data block 14 in each frame. The modulo-2 sum calculator 22 generates a single bit whose status is set depending on whether the data block 14 under examination contains an odd or even number of binary "1"s. Typically, if the data block 14 has an odd number of "1"s, then the modulo-2 sum calculator 22 generates a "1" whereas for an even number of "1"s, the calculator generates an "0".

Each of the second and third selectable, time-slot modulo-2 sum calculators 24 and 26 is coupled to the output of a separate one of the time-slot interchanger and non-time-slot interchanger blocks 16 and 18, respectively. The modulo-2 sum calculators 24 and 26 are each identical to the modulo-2 sum calculator 22, and each serves to calculate the parity of the selected data block leaving a separate one of the time-slot interchanger 16 and non-time-slot interchanger blocks 16 and 18, respectively. The parity calculation made by the modulo-2 sum calculator 26 is compared by a comparator 28 to the parity calculation made by the modulo-2 sum calculator 22. The output signal generated by the comparator 28 is reflective of the difference, if any, between the parities of the incoming and outgoing data blocks 14 processed by the non-time-slot interchanger block 18. Thus, the comparator 28 provides an accurate indication of the integrity of the data path through the non-time-slot interchanger block 18.

Just as the path integrity of the non-time-slot interchanger 18 is established by comparing the parities calculated by the modulo-2 sum calculators 22 and 26, the path integrity of time-slot interchanger block 16 is established by comparing the parities calculated by the modulo-2 sum calculators 22 and 24. However, such a comparison cannot be made directly because the data block 14 produced at the output of the time-slot interchanger block 16 now resides in a different time slot and/or frame other than the data block whose parity is calculated by the modulo-2 sum calculator 22. To facilitate the parity comparison, the output signal of the modulo-2 sum calculator 22 is input to a delay compensator 30 which serves to delay the calculator output signal by an interval (either one or more frames, and/or time slots or bytes) exactly the same as the delay of the selected data block passing through the time-slot interchanger block 16. A comparator 32 compares the output signal of the modulo-2 sum calculator 24 with the output signal of the delay compensator 30 to establish the integrity, or lack thereof, of the data path through the time-slot interchanger block 18.

The foregoing describes a technique for detecting the parity of a selected one of a set of successive data blocks 14 transmitted through a transmission system 10 to determine the integrity of the transmission path. A distinct advantage of the instant technique is that there is no need for each data block 14 to contain a separate parity bit in order to detect parity. Rather, the instant technique relies on checking the data block parity as a selected block enters and leaves the transmission system 12 in order to verify the path integrity.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for detecting if integrity exists in a transmission path through a transmission system which processes each of a plurality of successive blocks of data during a given time frame, each block of data devoid of parity information, comprising the steps of:

establishing a parity value of a selected one of the successive blocks of data upon entering the transmission system during each time frame;

processing the successive blocks of data without reference to their parity by transmitting the blocks through the entire system;

establishing a parity value of the selected block of data as it exits the transmission system, independent of the parity value of the selected block upon entering the transmission system; and comparing the parity value of the selected data block entering the transmission system to the parity value of the selected data block exiting the system, and indicating whether integrity exists in the transmission path in accordance with the difference between the established parities.

2. The method according to claim 1 wherein the step of processing the successive blocks of data includes the step of delaying the selected block by a predetermined delay interval.

3. The method according to claim 2 wherein the parity of the selected data block entering the transmission system is delayed by the predetermined interval before being compared to the parity of the selected data block exiting the transmission system.

4. The method according to claim 1 wherein each block of data is comprised of a stream of binary "1"s and "0"s and wherein each of the parity-establishing steps comprises the step of ascertaining the number of "1"s in the selected block of data.

* * * * *